Figure 1:
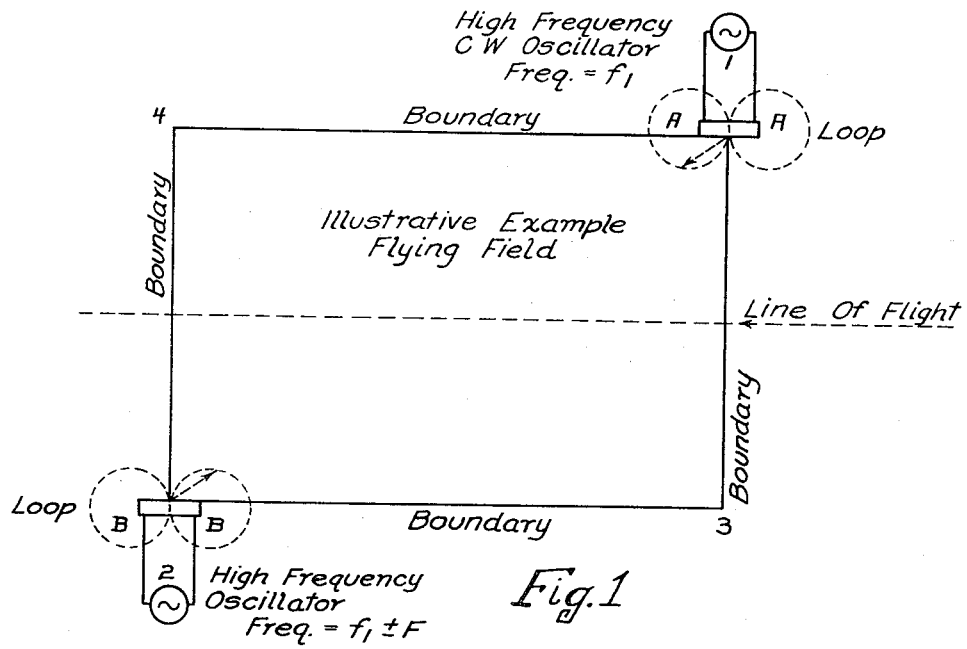

Feb. 20, 1934.    R. GUNN    1,947,469
ELECTRICAL MARKING DEVICE FOR AIRPLANE LANDING FIELDS
Filed Feb. 19, 1929

Inventor
Ross Gunn

By Harold Dodd.
Attorney

Patented Feb. 20, 1934

1,947,469

UNITED STATES PATENT OFFICE 1,947,469

ELECTRICAL MARKING DEVICE FOR AIRPLANE LANDING FIELDS

Ross Gunn, Washington, D. C.

Application February 19, 1929. Serial No. 341,059

10 Claims. (Cl. 250—11)

(Granted under the act of March 3, 1883, as amended April 30, 1928; 370 O. G. 757)

My invention relates broadly to methods and apparatus for electrically locating the extent of limited areas upon the earth's surface and more particularly to methods and apparatus for determining the limits of a landing field for airplanes and simultaneously determining the direction of the maximum length of the field.

In airplane flying at night or in heavy fog it has heretofore been practically impossible to ascertain clearly the extent of a landing field or the particular dimension of the field which affords the maximum landing distance.

The object of my invention is the production of apparatus such that an aviator may survey the field electrically while flying thereover.

Further objects of my invention will appear more fully hereinafter as the description of the method and apparatus is developed.

My invention consists substantially in the construction, combination and arrangement of parts associated therewith or as will be more fully hereinafter set forth as shown by the accompanying drawing and finally pointed out in the appended claims.

Figure 2:
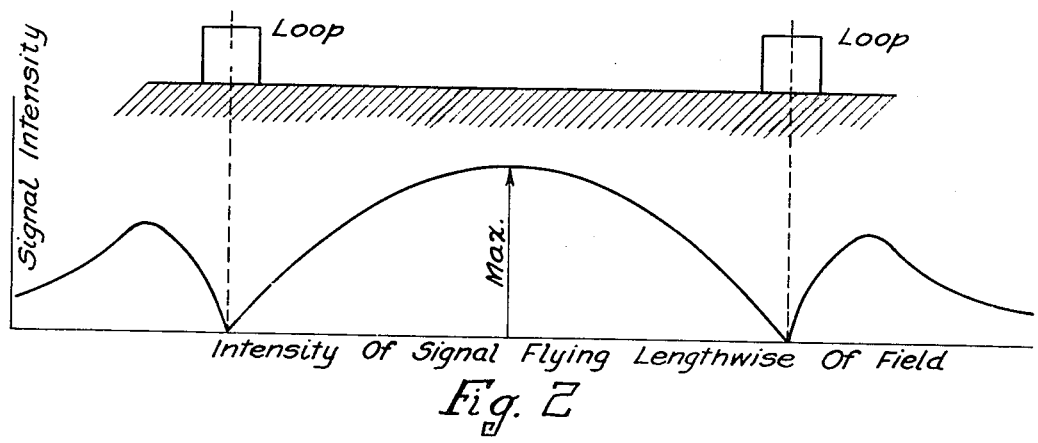

Reference is to be had to the accompanying drawing forming a part of this specification in which like reference characters indicate corresponding parts throughout the several views and in which:

Figure 1 is a plan view of a typical landing field with my invention installed thereon, Figure 2 is a graph of the intensity of the signals received as the plane is passing along the field parallel to its longer side on or parallel to the dotted line designated in Fig. 1 as the line of flight.

Referring to Figure 1, numerals 1 and 2 designate two bi-directive transmission systems which may be placed at diagonally opposite corners of a landing area, such as a floating landing deck, or other restricted landing areas. The major axis of transmission of each system, herein shown as directive loops, is placed along the major sides of the landing area as shown by the vector diagrams A—A and B—B of the two directional antenna systems 1 and 2. The minimum axis of each antenna system is placed along the lesser dimensions of the landing area.

The antenna system 1 transmits a signal the frequency of which is $f_1$. The antenna system 2 transmits a signal the frequency of which is $f_1$ plus F, F being within the audible range of frequencies. It is to be noted that at points around or over the landing area other than on the lines 1—3 and 2—4 there will be a heterodyne signal. If this signal is picked up by the receiver upon an airplane as it is flying along the line designated in the drawing as the line of flight, the intensity of the heterodyne signal producing the audible beat note as heard in the telephones of the receiver upon the airplane is indicated by the curve shown in Figure 2.

The signals transmitted from the two loop stations are received by any type of radio receiving device that may be carried by the airplane. This radio receiver is tuned substantially to the frequency of the transmitted waves transmitted from both stations. The intensity of the received signal received by means of the receiver varies as the field is crossed in any direction and approaches a maximum at or near the center. The drawing shows graphically the relation between the signal strength and the position at which the receiver is located with respect to the landing field.

In the arrangement set forth, the intensity of the heterodyne or beat frequency signal received at any point is proportional to the product of the amplitudes of the two frequencies received.

The minima points 5 and 6 of the curve shown in Fig. 2 are caused by the fact that as the plane passes either silent line of the antenna systems the receiver upon the airplane is activated by only one frequency so that there is no heterodyne note heard.

It is to be assumed that the pilot knows from maps, the position and size of the field at which he is about to land. For instance he could know the distance between the lines 1—3 and 2—4, and the direction in which they point. He may also determine the direction in which he is flying by a compass on his plane, or by some suitable radio signalling means distinct from applicant's means. He also knows the approximate maximum signal he may receive when flying directly over the center of the field.

If an aircraft equipped with a radio receiver capable of receiving the waves transmitted by antennæ 1 and 2 should be piloted crosswise of the field in Fig. 1 no sharp or well defined minima of the received beat frequency would be observed. This would be a positive indication to the pilot that the field was not being crossed lengthwise. If the aircraft should be piloted across the field lengthwise or at an acute angle to the longitudinal axis thereof two well defined minima would be observed. The relation of these minima to the lines constituting the silent axis of transmission of the antennæ 1 and 2 is clearly shown by the curve in Fig. 2.

While I have shown only a pair of directive transmitters adapted to exactly determine only two of the boundary lines of the field, it is to be distinctly understood that I do not wish to be limited to the showing of only two stations, as it is obvious that additional pairs of transmitters may be utilized to exactly determine other of the boundary lines of the field where an approximate indication of the extent of the field along one line is not sufficient.

It will be understood that the above description and accompanying drawing comprehend only the general and preferred embodiment of my invention and that minor detail changes in the construction and arrangement of parts may be made within the scope of the appended claims without sacrificing any of the advantages of my invention.

The invention described herein may be manufactured and used by or for the Government for governmental purposes without the payment to me of any royalty thereon.

Having thus described my invention what I claim is:

1. In a marker system for quadrilateral airplane landing fields, the combination of a plurality of directional radio transmitting systems each adapted to transmit a frequency different from the others, each having a major axis of transmission and a silent axis along which substantially no signal is transmitted, at least two of said transmitting systems being placed at diagonally opposite corners of said landing field with their silent axes arranged parallel to an axis of said field and having a transmission frequency difference therebetween of an audible frequency.

2. A marker system for indicating the limits of a substantially quadrilateral area comprising in combination a plurality of directional wave transmitting devices, each device having a major axis of transmission and a silent axis of transmission along which substantially no signal is transmitted, at least two of said transmitting devices being located at diagonally opposite corners of the area with the major axes of transmission of said devices substantially parallel to each other and to one of the axes that cuts opposite sides of said quadrilateral area and means for causing said devices to transmit different frequency waves, the difference between the frequencies of the transmitted waves being an audible frequency.

3. A marker system for indicating the limits of an elongated landing field comprising in combination a plurality of directional radio transmitting devices, each device having a major axis of transmission and a silent axis of transmission along which substantially no signal is transmitted, at least two of said transmitting devices being located adjacent to the ends of a diagonal of said field with the major axes of transmission of said devices substantially parallel to each other and to the longitudinal axis of said field and means for causing said devices to transmit different frequency waves, the difference between the frequencies of the transmitted waves being an audible frequency.

4. A marker system for indicating the limits of a substantially rectangular area comprising in combination a plurality of directional radio transmitting devices, each device having a major axis of transmission and a silent axis of transmission along which substantially no signal is transmitted, at least two of said transmitting devices being located at diagonally opposite corners of the area with the silent axes of said devices substantially parallel to each other and to the shorter axis of the area, and means for causing said devices to transmit different frequency waves, the difference between the frequencies of the transmitted waves being an audible frequency.

5. In a marker for indicating the limits of a substantially quadrilateral area, the combination of a directional radio transmitting system at a point adjacent the boundary of said area adapted to radiate waves of maximum strength along one side of said area and to radiate waves of substantially zero strength along an adjacent side of said area, and a directional radio transmitting system adjacent the boundary of said area and substantially opposite said first mentioned system, adapted to radiate waves of maximum strength along a side of said area substantially opposite said first mentioned side and to radiate waves of substantially zero strength along a side of said area substantially opposite said second mentioned side, the difference between the frequencies of the transmitted waves being an audible frequency.

6. In a marker for a substantially rectangular area, the combination of a radio transmitting station having a directional loop antenna adjacent to one corner of said area, a second radio transmitting station having a directional loop antenna adjacent to the diagonally opposite corner, the axes of the loops being parallel and substantially parallel to respective boundaries of the area, and the difference between the frequencies of the waves transmitted from said stations being an audible frequency.

7. In a marker for a substantially rectangular area, the combination of a bi-directional transmitting station at one corner of the area with the major axis of transmission thereof arranged perpendicular to one of the sides of said area, a second bi-directional transmitting station at the diagonally opposite corner of said area with the major axis of transmission thereof parallel to said axis of the first said station, the difference between the frequencies of the waves transmitted from said stations being an audible frequency.

8. The method of marking at least two of the boundaries of an area having at least two parallel sides, which comprises directionally transmitting waves from a point on one of said sides so that signals of maximum intensity are propagated perpendicular to said side and signals of zero intensity are propagated along said side, directionally transmitting waves of a different frequency from a point on said other side, displaced from the line of signals of maximum intensity transmitted from said first side, so that signals of maximum intensity are propagated perpendicular to the last said side and signals of zero intensity are transmitted along said side, whereby a beat note resulting from the two waves will exist at all points on or immediately adjacent said area except on the lines defining said two parallel sides.

9. The method of marking at least two of the sides of a polygonal area, which comprises directionally transmitting waves from a point on a first one of said sides so that signals of maximum intensity are propagated perpendicular to said side and signals of zero intensity are propagated along said side, directionally transmitting waves of a different frequency from a point on a second one of said sides so that signals of maximum intensity are propagated perpendicular to said second side and signals of zero intensity are propagated along said second side whereby a beat note resulting from the two waves will exist at all points on or immediately adjacent to said area except on the lines defining said first and second side.

10. The method of marking at least two of the sides of a polygonal area, which comprises directionally transmitting waves from a point on a first one of said sides with signals of zero intensity along said side, directionally transmitting waves of a slightly different frequency from a point on a second one of said sides with signals of zero intensity along said second side whereby a beat note resulting from the two waves will exist at all points on or immediately adjacent to said area except on the lines defining said first and second side.

ROSS GUNN.